United States Patent
Ehlers et al.

(10) Patent No.: US 6,596,961 B2
(45) Date of Patent: Jul. 22, 2003

(54) METHOD AND APPARATUS FOR MONITORING AND ADJUSTING A LASER WELDING PROCESS

(75) Inventors: Bodo Ehlers, Plymouth, MI (US); Stefan Heinemann, Ann Arbor, MI (US)

(73) Assignee: Fraunhofer USA, Inc., Plymouth, MI (US)

( * ) Notice: Subject to any disclaimer, the term of this patent is extended or adjusted under 35 U.S.C. 154(b) by 0 days.

(21) Appl. No.: 09/951,960

(22) Filed: Sep. 12, 2001

(65) Prior Publication Data

US 2003/0047542 A1 Mar. 13, 2003

(51) Int. Cl.⁷ .............................. B23K 26/20
(52) U.S. Cl. .............. 219/121.63; 219/121.82
(58) Field of Search ............. 219/121.63, 121.64, 219/121.61, 121.62, 121.78, 121.81, 121.82

(56) References Cited

U.S. PATENT DOCUMENTS

| | | | |
|---|---|---|---|
| 4,825,036 A | 4/1989 | Bickel et al. | |
| 4,872,940 A | * 10/1989 | Strum et al. | |
| 4,924,063 A | 5/1990 | Büchel et al. | |
| 5,038,016 A | 8/1991 | Robertson et al. | |
| 5,168,141 A | 12/1992 | Tashjian et al. | |
| 5,272,312 A | 12/1993 | Jurca | |
| 5,304,774 A | 4/1994 | Durheim | |
| 5,382,770 A | 1/1995 | Black et al. | |
| 5,449,882 A | * 9/1995 | Black et al. | |
| 5,450,333 A | 9/1995 | Minami et al. | |
| 5,841,097 A | 11/1998 | Esaka et al. | |
| 5,938,953 A | 8/1999 | Jurca | |
| 6,040,550 A | 3/2000 | Chang | |
| 6,084,203 A | 7/2000 | Bonigen | |
| 6,153,853 A | 11/2000 | Maruyama et al. | |
| 6,188,041 B1 | 2/2001 | Kim et al. | |
| 6,201,211 B1 | 3/2001 | Emmelmann | |

* cited by examiner

Primary Examiner—Samuel M. Heinrich
(74) Attorney, Agent, or Firm—Young & Basile, P.C.

(57) ABSTRACT

A laser material processing head for monitoring and adjusting a laser welding process. The present invention provides a laser material processing head having a laser source for providing a laser beam for laser welding a workpiece. A position sensor coupled to the laser material processing head measures the difference between the actual position of the workpiece and a predetermined theoretical position of the workpiece. An adjustment mechanism allows for adjustment of the laser beam in response to the position sensor. A closed loop controller interfaces the position sensor with the adjustment mechanism thereby providing a closed loop system within the laser material processing head.

20 Claims, 3 Drawing Sheets

METHOD AND APPARATUS FOR MONITORING AND ADJUSTING A LASER WELDING PROCESS

FIELD OF INVENTION

The present invention relates to a method and apparatus for monitoring and adjusting a laser welding process, and more particularly, a method and apparatus having a closed looped system within a laser material processing head for monitoring and adjusting a laser welding process.

BACKGROUND OF THE INVENTION

In most industrial laser welding processes, a two-dimensional or three-dimensional workpiece may be welded, cut or otherwise processed. The devices which perform the laser welding may be programmable, thereby allowing the contour of a weld seam to be pre-programmed according to ideal workpiece dimensions and positions. However, as the laser welding device follows the pre-programmed contour of the weld seam, the laser welding device does not consider the deviations which occur between the ideal positioning and dimensioning of the workpiece and the actual position and dimensional measurements of the workpiece. Deviations from the theoretical positioning and dimensioning of the workpiece are introduced through the limits and accuracy of handling systems, tolerances in the dimensions of the workpiece, and tolerances in the fixturing of the workpiece.

The cost of trying to reduce or eliminate the tolerances involved in the dimensioning and positioning of the workpiece is significant, if not cost prohibitive. Such deviations in the tolerances of the workpiece may be compensated for by altering the position of the laser beam. Previous systems have utilized sensors that measure the offset between the actual position of the laser beam and a predetermined targeted position. A signal from a sensor is sent to a controller of a handling system wherein the relative position between the laser beam and the workpiece is adjusted. However, communication between the sensor and the appropriate controller of the handling systems is cumbersome and difficult in that no standardized interfaces exist between the sensors incorporated in a laser beam head and a controller of a handling system. Thus, when the laser beam head is removed from the handling system and replaced with another handling system, or vice versa, the interface between the laser weld head and the handling system must be reconfigured and re-engineered. In a commercial environment, this is an ineffecient and expensive process.

It is desirable to create a laser material processing head that incorporates a closed loop monitoring system within the laser material processing head for providing the necessary adjustments to a laser welding process.

SUMMARY OF THE INVENTION

The present invention is a method and apparatus for monitoring and adjusting a laser welding process. A laser material processing head provides a laser source that provides a laser beam for laser welding a workpiece. A position sensor, coupled to the laser material processing head, measures the difference between the actual position of the workpiece and a predetermined theoretical position of the workpiece. An adjusting means, disposed within the head, positions the laser beam in response to a signal from the position sensor. A closed loop controller, coupled to the laser material processing head, interfaces the position sensor with the adjusting means to allow the adjusting means to properly position the laser beam with respect to the workpiece. A process sensor, coupled to the laser material processing head, may also be provided for indicating the quality of the weld created by the laser welding process. The closed loop controller may interface the process sensor with the adjusting means to properly adjust the laser beam by adjusting the power level of the laser source. The process sensor may also communicate with the handling system, separate from the laser material processing head, for adjusting the position of the workpiece relative to the laser head.

The adjusting means may provide a means for reflecting the laser beam toward the workpiece. The reflecting means may provide at least one mirror mounted on at least one pivotal axis. In addition, the mirror may also provide a concave surface for reflecting the laser beam.

The adjusting means may also provide a transparent means for redirecting the laser beam toward the workpiece. The transparent means may provide at least one prism mounted on a pivotal axis for pivoting the prism about at least one axis. The transparent means may also provide substantially flat parallel glass plates for deflecting the laser beam toward the workpiece.

Lastly, the adjusting means may provide an optic lens for focusing the laser beam onto the workpiece.

BRIEF DESCRIPTION OF THE DRAWINGS

In the drawings, like reference numerals refer to similar elements throughout the various views.

DESCRIPTION OF THE PREFERRED EMBODIMENT

Figure 1:
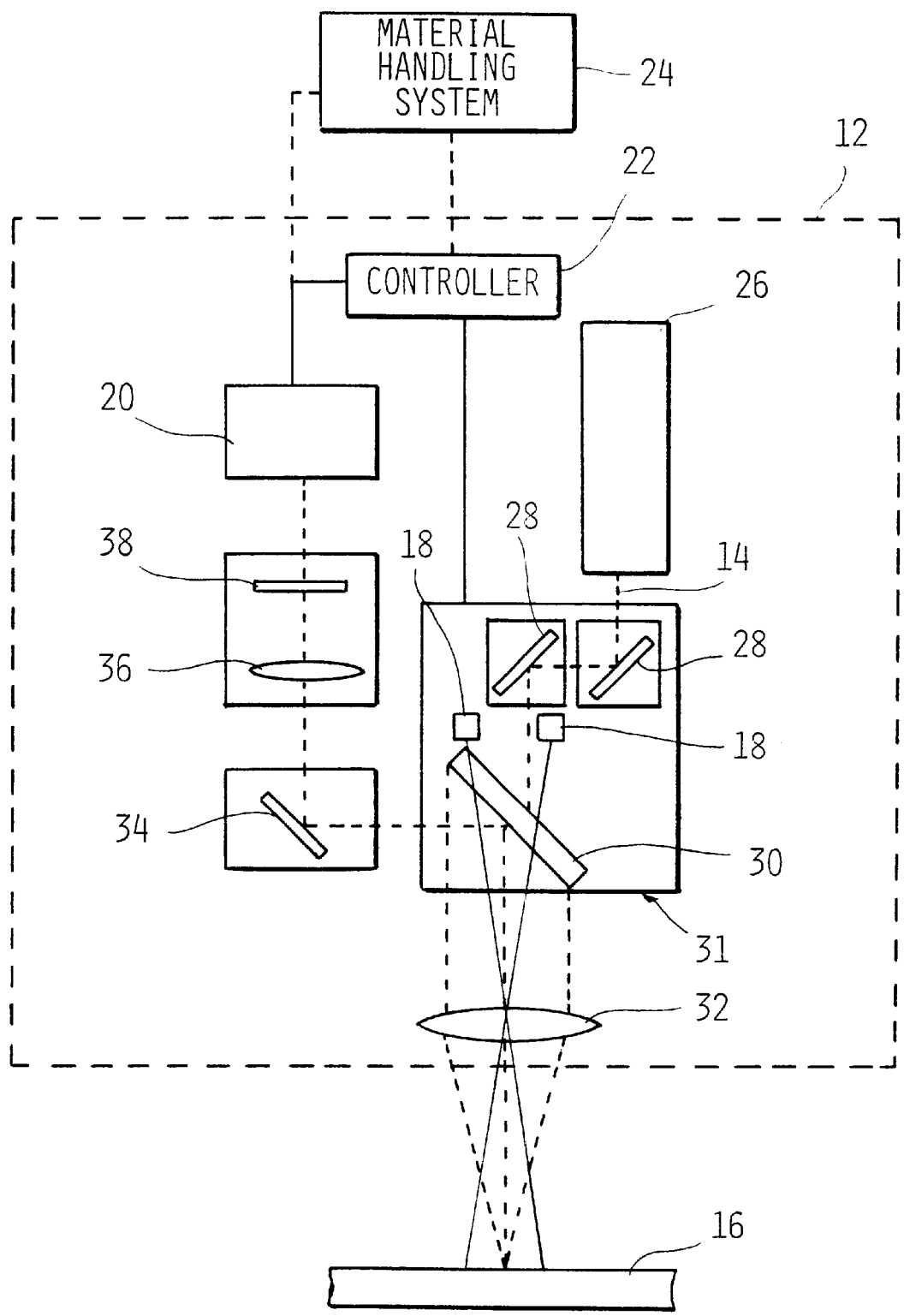
FIG. 1 is a schematic diagram of the method and apparatus of the present invention utilizing mirrors to reflect the laser beam to the workpiece.

Referring to the drawings, the present invention will now be described in detail with reference to the preferred embodiment.

Figure 2:
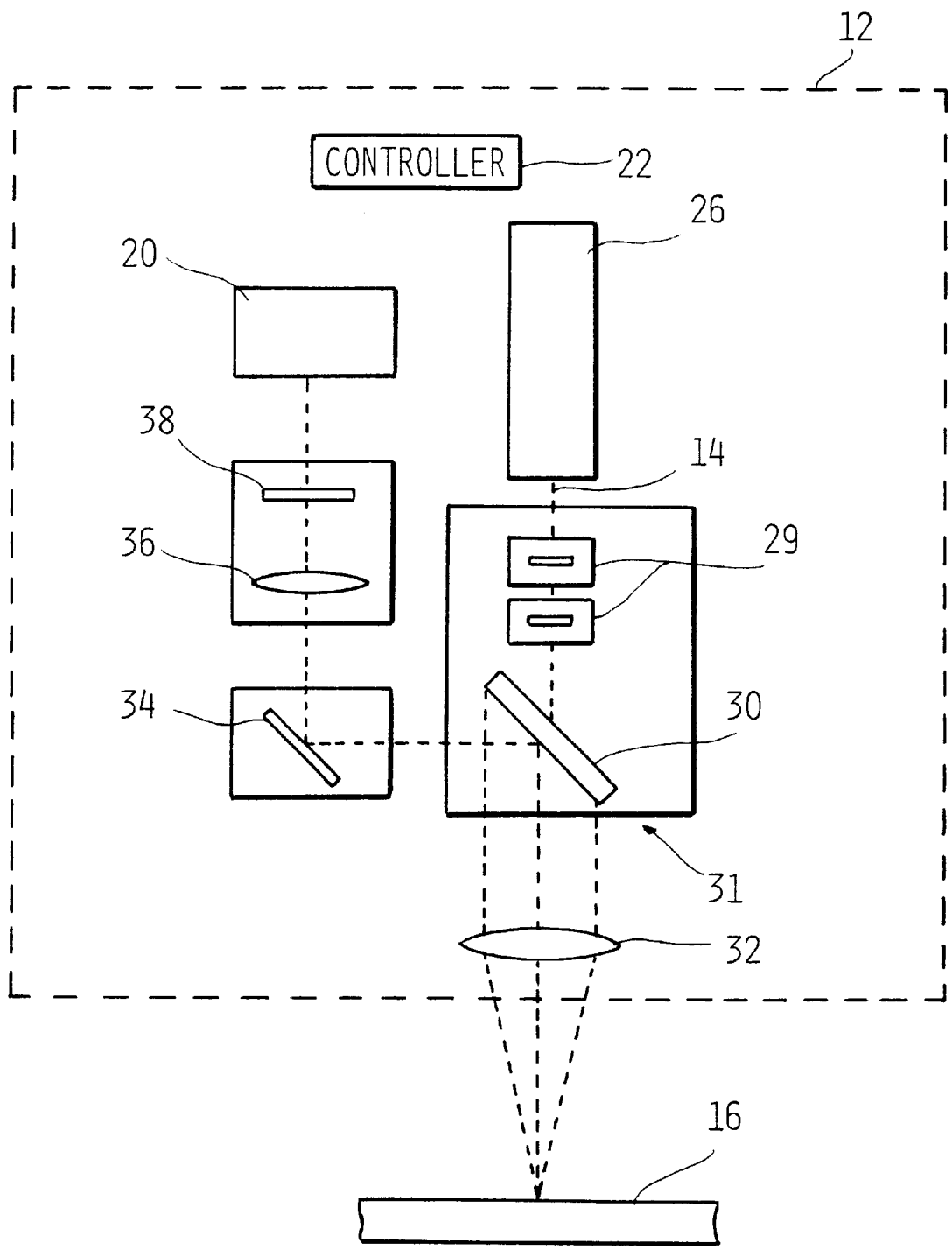
FIG. 2 is a schematic diagram of the method and apparatus of the present invention utilizing transparent elements to redirect the laser beam to the workpiece.
Figure 3:
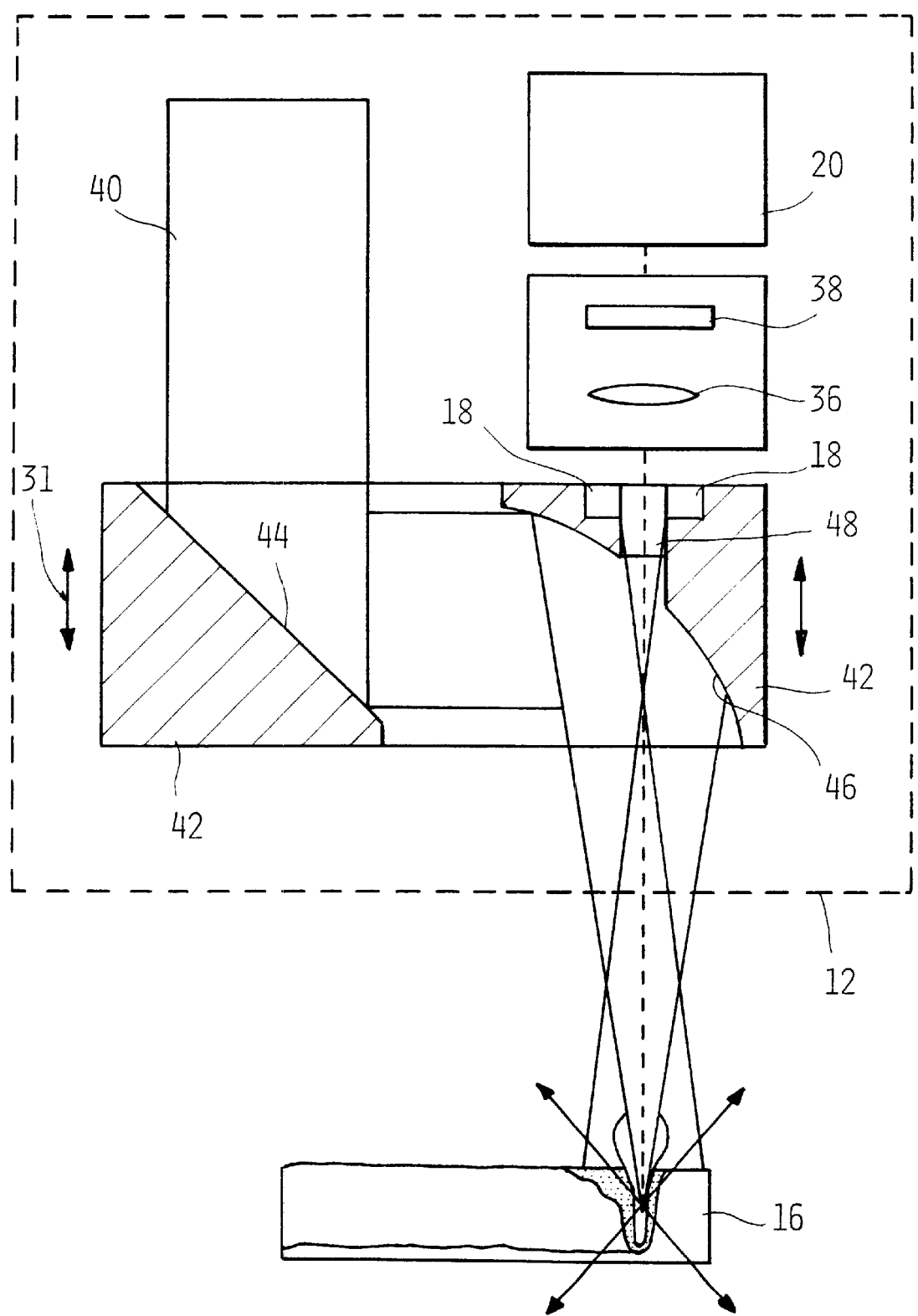
FIG. 3 is a schematic diagram of the method and apparatus of the present invention wherein a concave mirror is utilized to reflect the laser beam to the workpiece.

As illustrated in FIGS. 1–3, the present invention provides a method and apparatus 10 for monitoring and adjusting a laser welding process. The present invention provides a laser material processing head 12 that provides a laser beam 14 for laser welding a workpiece 16. The laser material processing head 12 also provides position sensors 18 for measuring the actual position of the workpiece 16 relative to a predetermined theoretical position of the workpiece 16. Process sensors 20 may also be coupled to the laser material processing head 12 for monitoring the quality of the weld (not shown) produced on the workpiece 16 by the laser beam 14. The laser material processing head 12 also provides a means for adjusting 31 laser beam 14 in response to the position sensor 18 and process sensor 20. A closed loop controller 22 provides an interface between the position sensor 18 and the process sensor 20 with the adjusting means. The position sensor 18 and the process sensor 20 may also be in communication with a handling system 24 separate from the laser material processing head 12, to provide adjustment of the laser head 12 with respect to the workpiece 16.

As seen in FIG. 1, the laser material processing head 12 provides a laser source 26 for producing a beam of high energy radiation, such as laser beam 14. The laser source 26 may transmit the beam of high energy radiation through an optical fiber or via a free-running beam of high energy radiation.

To direct and steer the laser beam 14, the present invention provides the adjusting means for positioning the laser beam 14 relative to the workpiece 16. The adjusting means may provide a reflecting means for reflecting the laser beam 14 toward the workpiece 16. The reflecting means may provide at least one movable mirror 28 for reflecting the laser beam 14 toward the workpiece 16. If only one mirror 28 is utilized, then the mirror 28 is mounted on a pivoting axis to allow the mirror 28 to rotate in both the X and Y axes. By pivoting the mirror 28 in the X and Y axes, the laser beam 14 can be directed along the X and Y axes along the workpiece 16. Alternatively, a pair of mirrors 28 may be utilized. When a pair of mirrors 28 is utilized, each mirror 28 is mounted on a pivoting axis wherein one of the mirrors 28 moves in the X axis and the other mirror 28 moves in the Y axis. This arrangement allows for the X and Y axis adjustment of the laser beam 14 on a workpiece 16 as the laser beam reflects off a first mirror 28, a second mirror 28, and then towards the workpiece 16. The pivoting of the mirrors 28 may be driven by a small electric drive (not shown).

To produce the workpiece 16, the laser beam 14 is transmitted through a wavelength filter 30 after reflecting off the mirrors 28. The wavelength filter 30 allows laser radiation to pass through the filter 14 while deflecting other wavelengths of light. The laser beam 14 is directed through a focusing optic 32 which is disposed in or coupled to the laser material processing head 12. The focusing optic 32 focuses the laser beam 14 on the workpiece 16 to create the weld. The focusing optic 32 may be moved toward or away from the workpiece 16 by the adjusting means. The adjusting means may use conventional means, such as an electric drive.

To sense the quality of the weld, the filter 30 works as a mirror for certain wavelengths. This beam of varying wavelengths is reflected to mirror 34 wherein the beam is focused by lens 36 and filtered by filter 38. The process sensor 20 receives the beam from filter 38 and provides a signal to either the closed loop controller 22 or directly to the handling system 24. The closed loop controller 22 may direct the adjusting means to adjust the power level of the laser source 26 in response to the quality of the weld. In addition, a signal from the process sensor 20 to the material handling system 24 may have the material handling system 24 adjust the relative distance between the laser material processing head 12 and the workpiece 16. The process sensor 20 may utilize a plasma detector to determine the quality of the weld or a vision system to evaluate a two-dimensional ray of the workpiece 16.

For the position sensors 18 to properly sense the position of the workpiece 16, the position sensors 18 may be mounted within or coupled to the laser material processing head 12. The position sensor 18 may provide a CCD camera, a low power laser beam separate from laser beam 14, or a spring-loaded mechanical probe. The position sensor 18 senses the actual position of the workpiece 16 and compares the actual position of the workpiece 16 to the theoretical pre-programmed position of the workpiece 16. The position sensor 18 then provides a signal to the closed loop controller 22 regarding the position of the workpiece 16.

In order for the adjusting means to respond to the position sensor 18, the closed loop controller 22 interfaces the position sensor 18 with the adjusting means. The closed loop controller 22 may provide a central processing unit or a high speed computer which receives and interprets the signal from the position sensor 18 and then provides a responsive signal to the adjusting means. The adjusting means moves mirrors 28 in order to properly position the laser beam 14 on the workpiece 16.

In an alternative embodiment, the adjusting means provides a transparent means for deflecting the laser beam 14 toward the workpiece 16 as seen in FIG. 2. The transparent means 29 may include at least one prism or a pair of substantially parallel glass plates. In either case, the transparent means is mounted on a pivoting axis for pivoting the transparent means about an X and Y axis. By moving the transparent means and deflecting the laser beam 14, the laser beam 14 can be properly positioned with respect to workpiece 16.

In yet another embodiment, the present invention may utilize infrared or $CO_2$ lasers as its laser source 26. As seen in FIG. 3, the infrared or $CO_2$ laser 40 emits a beam on two surfaces of a mirror 42. The first surface 44 is a substantially flat angular surface which reflects the beam toward a second surface 46 of the mirror 42 wherein the second surface is substantially concave. The laser beam 14 reflects off the second surface 46 of the mirror 42 and is directed onto the workpiece 16. An aperture 48 is provided in a central portion of the second surface 46 of the mirror 42 thereby allowing the position sensors 14 to view the workpiece 16 through the aperture 48. In addition, the aperture 48 allows various wavelengths of light to pass through the lens 36 and filter 38. The wavelength from filter 38 is sensed by the process sensor 20, and a signal is sent by the process sensor 20 to either the closed loop controller 22 or the material handling device 24.

In operation, the present invention is utilized by having the laser source 26 emit a laser beam 14 through an adjusting means. The adjusting means reflects or deflects and focuses the laser beam 14 onto the workpiece 16. The position sensors 18 sense the position of the workpiece 16 and compare the position of the workpiece 16 to the predetermined theoretical position of the workpiece 16. The position sensor 18 provides a signal to the closed loop controller 22 which interprets the signal and responds to the adjusting means. The adjusting means then adjust the reflection or deflection and focusing of the laser beam 14 to properly adjust the laser beam 14 with respect to the workpiece 16. The process sensor 20 also processes the wavelengths received from the workpiece 16. The process sensor 20 interprets the signal and may provide a signal to the closed loop controller 22 or the material handling system 24. If the closed loop controller 22 receives a signal from the process sensor 20, then the adjusting means may adjust the power level of the laser source 26. If the process sensor 20 signal is sent to the material handling system 24, the material handling system 24 may adjust the position of the laser material processing head 12 relative to the workpiece 16.

While the invention has been described in connection with what is presently considered to be the most practical and preferred embodiment, it is to be understood that the invention is not to be limited to the disclosed embodiments, but to the contrary, it is intended to cover various modifications of equivalent arrangements included within the spirit and scope of the appended claims. The scope is to be accorded the broadest interpretation so as to encompass all such modifications and equivalent structures as is permitted under the laws.

What is claimed is:

1. An apparatus for monitoring and adjusting a laser welding process, comprising:
   a laser material processing head;
   a laser source, disposed in said laser material processing head, for providing a laser beam for laser welding a workpiece;
   a position sensor, coupled to said laser material processing head, for measuring the actual position of said workpiece relative to a predetermined theoretical position of said workpiece;
   means, disposed in said head, for adjusting the position of said laser beam;
   a closed loop controller, coupled to said laser material processing head for interfacing said position sensor with said adjusting means to allow said adjusting means to properly position said laser beam in response to the position of said workpiece.

2. The apparatus stated in claim 1, further comprising:
   a process sensor, coupled to said laser material processing head, for monitoring the quality of said laser welding of said workpiece wherein said closed loop controller interfaces said process sensor with said adjusting means to properly adjust the power level of said laser source.

3. The apparatus stated in claim 2, further comprising:
   a handling system, separate from said laser material processing head, for adjusting the position of said workpiece relative to said laser material processing head; and
   said closed loop controller interfacing said process sensor with said handling system to allow said handling system to adjust the relative position of said workpiece relative to said laser material processing head in response to said process sensor.

4. The apparatus stated in claim 1, wherein said adjusting means further comprises:
   means for reflecting said laser beam toward said workpiece.

5. The apparatus stated in claim 4, further comprising:
   at least one mirror mounted on a pivotal axis for movement in at least one axis.

6. The apparatus stated in claim 5, further comprising:
   said mirror having a concave surface for reflecting said laser beam.

7. The apparatus stated in claim 1, wherein said adjusting means further comprises:
   transparent means for redirecting said laser beam toward said workpiece.

8. The apparatus stated in claim 7, wherein said redirecting transparent means further comprises:
   at least one prism mounted on a pivotal axis for movement in at least one axis.

9. The apparatus stated in claim 7, wherein said redirecting transparent means further comprises:
   a plurality of substantially flat parallel glass plates mounted on a pivotal axis for movement in at least one axis.

10. The apparatus stated in claim 1, wherein said adjusting means further comprises:
    an optic lens for focusing said laser beam on said workpiece.

11. A method for monitoring and adjusting a laser welding process, comprising the steps of:
    providing a laser material processing head;
    providing a laser source in said laser material processing head for producing a laser beam for laser welding a workpiece;
    sensing the actual position of said workpiece relative to a predetermined theoretical position of said workpiece; and
    properly positioning said laser beam in response to the position of said workpiece by interfacing said sensing of the position of said workpiece with said adjusting of the position of said laser beam.

12. The method stated in claim 11, comprising the steps of:
    monitoring the quality of said laser beam welding of said workpiece and interfacing said quality monitoring with said positioning of said laser beam to properly adjust the relative position of said laser beam relative to said workpiece.

13. The method stated in claim 12, further comprising the steps of:
    adjusting the position of said laser material processing head relative to said workpiece; and
    interfacing said quality monitoring with said position adjusting for properly adjusting the position of said laser head relative to said workpiece.

14. The method stated in claim 1, further comprising the steps of:
    reflecting said laser beam toward said workpiece.

15. The method stated in claim 4, wherein said reflecting of said laser beam further comprises:
    at least one mirror mounted on the pivotal axis for movement in at least one axis.

16. The method stated in claim 5, further comprising:
    said mirror having a concave surface for reflecting said laser beam.

17. The method stated in claim 1, further comprising the steps of:
    redirecting said laser beam through a transparent device toward said workpiece.

18. The method stated in claim 8, further comprising:
    the transparent device being a prism.

19. The method stated in claim 8, further comprising:
    said transparent device being a plurality of substantially flat parallel glass plates.

20. The method stated in claim 1, further comprising the steps of:
    focusing said laser beam on said workpiece with an optic lens.

* * * * *

UNITED STATES PATENT AND TRADEMARK OFFICE
CERTIFICATE OF CORRECTION

PATENT NO. : 6,596,961 B2
DATED : July 22, 2003
INVENTOR(S) : Ehlers

It is certified that error appears in the above-identified patent and that said Letters Patent is hereby corrected as shown below:

<u>Column 3,</u>
Line 28, insert -- a weld on -- after "produce";

<u>Column 4,</u>
Line 44, delete "adjust" and insert -- adjusts --; and

<u>Column 5,</u>
Line 47, delete "comprising" and insert -- comprises --.

Signed and Sealed this

Twenty-first Day of October, 2003

JAMES E. ROGAN
*Director of the United States Patent and Trademark Office*